(12) United States Patent
Aubrion et al.

(10) Patent No.: US 11,530,688 B2
(45) Date of Patent: Dec. 20, 2022

(54) LIGHTNING PROTECTION OF A SECTIONED WIND TURBINE BLADE

(71) Applicant: LM WIND POWER A/S, Kolding (DK)

(72) Inventors: Mathilde Aubrion, Kolding (DK); Boas Eiriksson, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/287,835

(22) PCT Filed: Oct. 24, 2019

(86) PCT No.: PCT/EP2019/079025
§ 371 (c)(1),
(2) Date: Apr. 22, 2021

(87) PCT Pub. No.: WO2020/084050
PCT Pub. Date: Apr. 30, 2020

(65) Prior Publication Data
US 2021/0381494 A1    Dec. 9, 2021

(30) Foreign Application Priority Data
Oct. 25, 2018 (EP) .................. 18202636

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2240/302* (2013.01); *F05B 2280/2006* (2013.01); *F05B 2280/6003* (2013.01)

(58) Field of Classification Search
CPC .... F03D 1/0633; F03D 1/0641; F03D 1/0675; F03D 1/0683; F05B 2240/302; F05B 2280/2006; F05B 2280/6003
See application file for complete search history.

(56) References Cited

U.S. PATENT DOCUMENTS 10,830,214 B2 * 11/2020 Akhtar .................. F03D 80/30
11,181,095 B2 * 11/2021 Girolamo .............. F03D 1/0675
(Continued)

FOREIGN PATENT DOCUMENTS

| EP | 2789851 A1 | 10/2014 |
|---|---|---|
| EP | 3184814 A1 | 6/2017 |
| WO | 2013007267 A1 | 1/2013 |

OTHER PUBLICATIONS

International Search Report dated Jan. 21, 2020 for International Application No. PCT/EP2019/079025.
(Continued)

*Primary Examiner* — Justin D Seabe
*Assistant Examiner* — Sang K Kim
(74) *Attorney, Agent, or Firm* — Nath, Goldberg & Meyer; Jerald L. Meyer; Tanya E. Harkins (57) ABSTRACT

Disclosed is a spar beam and a wind turbine blade comprising a spar beam. The wind turbine blade comprising a first blade section extending along a longitudinal axis from a root to a first end and a second blade section extending along the longitudinal axis from a second end to a tip. The spar beam comprises a conductive beam sheath circumscribing at least a beam sheath angular distance of the spar beam about the spar beam axis and longitudinally extending from a fourth beam axis position to a fifth beam axis position.

24 Claims, 8 Drawing Sheets

(56) References Cited

U.S. PATENT DOCUMENTS

2010/0329865 A1    12/2010  Hibbard
2014/0286780 A1*   9/2014   Lemos ................... F03D 80/50
                                                      29/889.71
2019/0145383 A1*   5/2019   Christiansen ......... F03D 1/0675
                                                      416/146 R
2019/0195203 A1*   6/2019   Fujioka ................. H02G 13/00

OTHER PUBLICATIONS

Extended European Search Report dated Apr. 12, 2019 for application No. EP18202636.9.

* cited by examiner

LIGHTNING PROTECTION OF A SECTIONED WIND TURBINE BLADE

This is a National Phase Application filed under 35 U.S.C. 371 as a national stage of PCT/EP2019/079025, filed Oct. 24, 2019, an application claiming the benefit of European Application No. 18202636.9, filed Oct. 25, 2018, the content of each of which is hereby incorporated by reference in its entirety.

The present disclosure relates to lightning protection of a wind turbine blade, more specifically the disclosure relates to lightning protection of a wind turbine blade comprising a first blade section and a second blade section, and optionally more blade sections.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are, inside the blade, in electric connection with a metallic down conductor that is able to connect a lightning current to earth.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

As the demand for blades for wind turbines tends towards blades of increasing lengths, a need concurrently arises for manufacture of blades having increased rigidity and a comparatively lower weight. One way of achieving these properties it to combine various types of fibres in the laminate of the blades, for instance it is an option to combine glass fibres and carbon fibres, and likewise carbon fibres or glass fibres may advantageously be combined with steel fibres. Combinations with other types of fibres are thus also possible and it is also an option to exclusively employ carbon fibres or other suitable fibre type. Combination of e.g. glass fibres with carbon fibres in a so-called hybrid laminate may possess a problem in that some of the fibre types are electrically conductive, e.g. carbon fibres and steel fibres. A lightning strike directly into the laminate may cause damage to a blade comprising electrically conductive fibres, as they would conduct the current and thereby i.a. be greatly heated. This is particularly problematic in case of fibres having comparatively poor conductivity, such as carbon fibres, and in case of hybrid laminates with fibres in e.g. mat-shape, where the individual mat may e.g. have a small portion of electrically conductive fibres and a larger portion of e.g. glass fibres that are not electrically conductive.

Further as the demands for blades for wind turbines tends towards blades of increasing lengths, attention is increasing on concepts of manufacturing blades in sections for being assembled at the installation site. Elements provided for allowing a secure and reliable connection between individual sections of the wind turbine blade bring about another challenge to protect the wind turbine blade from damages caused by lightning strikes. Such wind turbine blade, comprising a plurality of sections, may be known as a split blade, or two-part blade, or segmented blade or similar.

SUMMARY

It is an object of the present disclosure to provide ways for lightning protection of a wind turbine blade, such as a split/segmented blade, where the wind turbine blade is manufactured by manufacturing two (or more) blade sections and then joining them. In particular, it is an objective of the present disclosure to provide a spar beam, e.g. for connecting a first blade section and a second blade section, adapted for lightning protection, e.g. for protecting the wind turbine blade against lightning strikes, e.g. in a more advantageous way.

The present disclosure provides ways of improving lightning protection of a wind turbine blade, in particular being a split/segmented blade. The disclosure advantageously provides ways of combining different lightning protection concepts, facilitating decreased risk of damaging lightning strikes, and reducing material costs and production costs.

Accordingly, a spar beam is disclosed, such as a spar beam for connecting, such as structurally connecting, a first blade section and a second blade section of a wind turbine blade, such as a wind turbine blade extending along a longitudinal axis from a root through a first airfoil region and a second airfoil region to a tip. The first blade section may extend along a longitudinal axis to a first end and the second blade section may extend along the longitudinal axis from a second end towards the tip. The first blade section may extend from the root. The second blade section may extend to the tip. The first blade section may comprise a root region, optionally including the root. The first blade section may comprise the first airfoil region. The first blade section may comprise a transition region between the root region and the first airfoil region. The second blade section may comprise the second airfoil region. The second airfoil region may comprise the tip. The first blade section and the second blade section may comprise a pressure side, a suction side and a chord line extending between a leading edge and a trailing edge.

The spar beam longitudinally extends along a spar beam axis from a first beam axis position, e.g. a first beam end, to a second beam axis position, e.g. a second beam end. The spar beam axis may be substantially parallel to the longitudinal axis of the wind turbine blade.

The spar beam is configured to be positioned such that the first beam axis position is located in the first airfoil region and the second beam axis position is located in the second airfoil region. The spar beam is configured to be positioned such that a third beam axis position, between the first beam axis position and the second beam axis position, is aligned with the second end of the second blade section and/or the first end of the first blade section.

The spar beam comprises a conductive beam sheath. The conductive beam sheath circumscribes at least a beam sheath angular distance about the spar beam axis. The conductive beam sheath may longitudinally extend, e.g. along the spar beam axis, from a fourth beam axis position to a fifth beam axis position. The conductive beam sheath may be a conductive beam sheath for a lightning protection system of a wind turbine blade.

The fourth beam axis position may be between the first beam axis position and the second beam axis position. The fifth beam axis position may be between the first beam axis position and the second beam axis position. The fourth beam axis position may be the first beam axis position. The fifth beam axis position may be the second beam axis position.

Also disclosed is a wind turbine blade extending along a longitudinal axis from a root through a first airfoil region and a second airfoil region to a tip. The wind turbine blade comprising a first blade section extending along the longitudinal axis to a first end and a second blade section extending along the longitudinal axis from a second end towards the tip. The first blade section may extend from the root. The second blade section may extend to the tip. The first blade section may comprise a root region, optionally including the root. The first blade section may comprise the first airfoil region. The first blade section may comprise a transition region between the root region and the first airfoil region. The second blade section may comprise the second airfoil region. The second airfoil region may comprise the tip. The first blade section and the second blade section may comprise a pressure side, a suction side and a chord line extending between a leading edge and a trailing edge. The wind turbine blade may be a split blade, or two-part blade, or segmented blade. Each blade section may be a blade segment.

The wind turbine blade comprises a spar beam, such as the above disclosed spar beam, for connecting the first blade section and the second blade section. The spar beam longitudinally extends along a spar beam axis from a first beam axis position, e.g. a first beam end, to a second beam axis position, e.g. a second beam end. The spar beam axis may be substantially parallel to the longitudinal axis of the wind turbine blade.

The spar beam is positioned such that the first beam axis position is located in the first airfoil region and the second beam axis position is located in the second airfoil region. The spar beam is positioned such that a third beam axis position, between the first beam axis position and the second beam axis position, is aligned with the second end of the second blade section and/or the first end of the first blade section.

The spar beam comprises a conductive beam sheath. The conductive beam sheath circumscribes at least a beam sheath angular distance of the spar beam about the spar beam axis. The conductive beam sheath may longitudinally extend, e.g. along the spar beam axis, from a fourth beam axis position to a fifth beam axis position.

The fourth beam axis position may be between the first beam axis position and the second beam axis position. The fifth beam axis position may be between the first beam axis position and the second beam axis position. The fourth beam axis position may be the first beam axis position. The fifth beam axis position may be the second beam axis position.

It is noted that any feature described with respect to one aspect of the disclosure is applicable to any other aspect of the disclosure. For example, any disclosure relating to the spar beam is applicable to the spar beam of the disclosed wind turbine blade and vice versa.

The fifth beam axis position may be the second beam axis position. Alternatively, the fifth beam axis position may be between the fourth beam axis position and the second beam axis position.

The fourth beam axis position may be between the third beam axis position and the fifth beam axis position. The fourth beam axis position and the third beam axis position may be separated by a first distance. The first distance may be more than 10 mm, such as more than 20 mm, such as 30 mm.

The conductive beam sheath may be a mesh or partly a mesh, e.g. of electrically conductive material. The conductive beam sheath may be of an electrically conductive material, such as carbon fiber reinforced polymer or metals, such as copper, or alloy of metals.

The beam sheath angular distance may be more than 90 degrees, such as more than 180 degrees, such as more than 270 degrees, such as 360 degrees. For example, the conductive beam sheath may circumscribe the spar beam.

It is an advantage of the present disclosure, that lightning protection of a spar beam for connecting sections of a wind turbine blade may be provided. In particular, the present disclosure provides an advantageous lightning protection of a spar beam comprising electrically conductive elements, such as carbon fibre.

The spar beam may be configured for structurally connecting the first blade section and the second blade section of the wind turbine blade. For example, so as to be able to transmit loads between the first blade section and second blade section.

An outer surface of the spar beam may be configured for being attached to an inner surface, optionally an inner shell surface, of the first and/or second blade section of the wind turbine blade.

The conductive beam sheath may be configured for receiving and transmitting an electric current from a lightning strike on the wind turbine blade, and thereby may protect the spar beam from a lightning strike on the wind turbine blade.

The spar beam may be separately provided or separately manufactured from blade sections and/or the wind turbine blade.

The spar beam may comprise carbon fibres, such as carbon fibre elements, e.g. with a fibre volume ratio of more than 40%, such as more than 50%, such as more than 60%. For example, the spar beam may comprise pultruded carbon-fibre reinforced elements. The spar beam may comprise one or more pultruded fibre reinforced element, such as a first pultruded fibre reinforced element and/or a second pultruded fibre reinforced element. The one or more pultruded fibre reinforced element, such as the first pultruded fibre reinforced element and/or the second pultruded fibre reinforced element may be pultruded carbon-fibre reinforced elements. The first pultruded fibre reinforced element may be a first pultruded carbon-fibre reinforced element. The second pultruded fibre reinforced element may be a second pultruded carbon-fibre reinforced element.

The spar beam may comprise carbon fibres between a fourteenth beam axis position and a fifteenth beam axis position. For example, the pultruded fibre reinforced element(s), such as the first pultruded fibre reinforced element and/or the second pultruded fibre reinforced element may comprise carbon fibres between the fourteenth beam axis position and the fifteenth beam axis position. Alternatively or additionally, the pultruded fibre reinforced element(s), such as the first pultruded fibre reinforced element and/or the second pultruded fibre reinforced element may extend between the fourteenth beam axis position and the fifteenth beam axis position.

The fourteenth beam axis position may be between the first beam axis position and the second beam axis position, such as between the first beam axis position and the third beam axis position. The fourteenth beam axis position may be the first beam axis position. The fifteenth beam axis position may be between the first beam axis position and the second beam axis position, such as between the second beam axis position and the third beam axis position, such as between the fifth beam axis position and the third beam axis position, such as between the fifth beam axis position and the fourth beam axis position. The fifteenth beam axis position may be between the second beam axis position and the fourteenth beam axis position, such as between the fifth beam axis position and the fourteenth beam axis position. The fifteenth beam axis position and the fifth beam axis position may be separated by a fourth distance. The fourth distance may be more than 10 mm, such as more than 20 mm, such as more than 30 mm, such as 50 mm.

The spar beam may comprise glass fibres between the fourteenth beam axis position and the first beam axis position. The spar beam may comprise glass fibres between the fifteenth beam axis position and the second beam axis position. For example, the spar beam may comprise pultruded fibre reinforced elements, such as pultruded glass fibre-reinforced elements, extending from the first beam axis position to the fourteenth beam axis position and/or from the second beam axis position to the fifteenth beam axis position. For example, the pultruded fibre reinforced element(s), such as the first pultruded fibre reinforced element and/or the second pultruded fibre reinforced element may comprise glass fibres between the first beam axis position and the fourteenth beam axis position and/or between the second beam axis position and the fifteenth beam axis position.

The cross section of the spar beam may be rectangular. Alternatively the cross section of the spar beam may be circular, oval or have a combination of straight and curved sides.

The wind turbine blade, such as the first blade section of the wind turbine blade, may comprise conductive shell sheath(s), e.g. including a first conductive shell sheath and/or a second conductive shell sheath. Conductive shell sheath(s) may complement the beam sheath of the spar beam and/or be provided to replace the beam sheath at certain positions along the longitudinal direction of the wind turbine blade.

A first shell part of the first blade section may comprise a first conductive shell sheath. The first conductive shell sheath may circumscribe at least a first sheath angular distance about the longitudinal axis from a first primary sheath angular position to a first secondary sheath angular position. The first conductive shell sheath may longitudinally extend from a first sheath position to a second sheath position.

A second shell part of the first blade section may comprise a second conductive shell sheath. The second conductive shell sheath may circumscribe at least a second sheath angular distance about the longitudinal axis from a second primary sheath angular position to a second secondary sheath angular position. The second conductive shell sheath may longitudinally extend from a third sheath position, e.g. the first sheath position, to a fourth sheath position, e.g. the second sheath position.

The shell of the wind turbine blade may comprise one or more spar caps, such as a first spar cap and/or a second spar cap. For example, the first shell part may comprise a first spar cap. The first spar cap may be on the pressure side. Alternatively, the first first spar cap on the suction side. The second shell part may comprise a second spar cap. The second spar cap may be on the suction side. Alternatively, the second spar cap may be on the pressure side. A spar cap, such as the first spar cap and/or the second spar cap may be a fibre-reinforced principal laminate. A spar cap, such as the first spar cap and/or the second spar cap may comprise electrically conductive fibres, such as carbon fibres. A spar cap, such as the first spar cap and/or the second spar cap may be denoted main laminate and/or load carrying laminate.

The first conductive shell sheath may be positioned such that the first spar cap is located between the first primary sheath angular position and the first secondary sheath angular position. The second conductive shell sheath may be positioned such that the second spar cap is located between the second primary sheath angular position and the second secondary sheath angular position.

The first conductive shell sheath and/or the second conductive shell sheath may be a mesh of electrically conductive material. The first conductive shell sheath and/or the second conductive shell sheath may be of an electrically conductive material, such as carbon fiber reinforced polymer or metals, such as copper, or alloy of metals.

The wind turbine blade may comprise one or more down conductors, e.g. including a first down conductor and/or a second down conductor. The first blade section may comprise a first down conductor. The first down conductor may be configured for conducting lightning current to ground. The second blade section may comprise a second down conductor. The second down conductor may be configured for conducting lightning current to ground, e.g. via the first down conductor. The second down conductor may be configured for being connected to the first down conductor of the first blade section. The second down conductor may be connected to the first down conductor of the first blade section.

The first down conductor may be electrically connected to the first conductive shell sheath and/or the second conductive shell sheath. The second down conductor may be electrically connected to the conductive beam sheath. The second down conductor may be electrically connected to the conductive beam sheath at one or more, such as a plurality, of beam axis positions, e.g. a sixth beam axis position and/or a seventh beam axis position.

The second down conductor may be electrically connected to the conductive beam sheath, e.g. at a sixth beam axis position. The sixth beam axis position may be between the fourth beam axis position and the fifth beam axis position. The sixth beam axis position and the fifth beam axis position may be separated by a second distance. The second distance may be less than 150 mm, such as less than 100 mm, such as less than 50 mm. The sixth beam axis position may be chosen such as to provide the electrical connection between the second down conductor and the conductive beam sheath as close to the end of the conductive beam sheath. For example, the sixth beam axis position may be the fifth beam axis position.

The second down conductor may be electrically connected to the conductive beam sheath, e.g. at a seventh beam axis position. The seventh beam axis position may be between the fourth beam axis position and the fifth beam axis position. The seventh beam axis position and the fourth beam axis position may be separated by a third distance. The third distance may be less than 150 mm, such as less than 100 mm, such as less than 50 mm. The seventh beam axis position may be chosen such as to provide the electrical connection between the second down conductor and the conductive beam sheath as close to the end of the conductive beam sheath. For example, the seventh beam axis position may be the fourth beam axis position.

The second blade section may comprise one or more lightning receptors, e.g. at or in proximity of the external surface of the wind turbine blade. The second blade section may comprise a first lightning receptor, e.g. at or in proximity of the external surface of the blade. The first lightning receptor may be positioned at or in proximity of the tip. The second down conductor may be electrically connected to the first lightning receptor.

The first blade section may comprise one or more lightning receptors, e.g. at or in proximity of the external surface of the wind turbine blade. The first blade section may comprise a first lightning receptor, e.g. at or in proximity of the external surface of the blade. The second lightning receptor may be positioned at or in proximity of the first end. The first down conductor may be electrically connected to the second lightning receptor.

Also disclosed is a method for structurally connecting a first blade section with a second blade section of a wind turbine blade, the method comprising:

providing a spar beam according to the present disclosure and the first and second blade section of the wind turbine blade;

positioning the spar beam such that the first beam axis position is located in the first airfoil region of the first blade section and the second beam axis position is located in the second airfoil region of the second blade section and the third beam axis position is aligned with the second end of the second blade section; and structurally connecting the first blade section and the second blade section via the spar beam.

Further disclosed is the use of a spar beam of the present disclosure for structurally connecting a first blade section and a second blade section to form a wind turbine blade, wherein the wind turbine blade extends along a longitudinal axis from a root through a first airfoil region and a second airfoil region to a tip, wherein the first blade section extends along the longitudinal axis to a first end and the second blade section extends along the longitudinal axis from a second end towards the tip, the first blade section comprising the first airfoil region, the second blade section comprising the second airfoil region.

Any of the mentioned beam axis positions, such as the third beam axis position, the fourth beam axis position, the fifth beam axis position, the sixth beam axis position, the seventh beam axis position, the eighth beam axis position, the ninth beam axis position, the tenth beam axis position, the eleventh beam axis position, the twelfth beam axis position, the thirteenth beam axis position, the fourteenth beam axis position and/or the fifteenth beam axis position, may be between the first beam end and the second beam end, such as between the first beam axis position and the second beam axis position.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

FIG. 5c is a schematic diagram illustrating an alternative configuration of the wind turbine blade of FIG. 5a, FIG. 6a is a schematic diagram illustrating an exemplary wind turbine blade.

DETAILED DESCRIPTION

Figure 1:
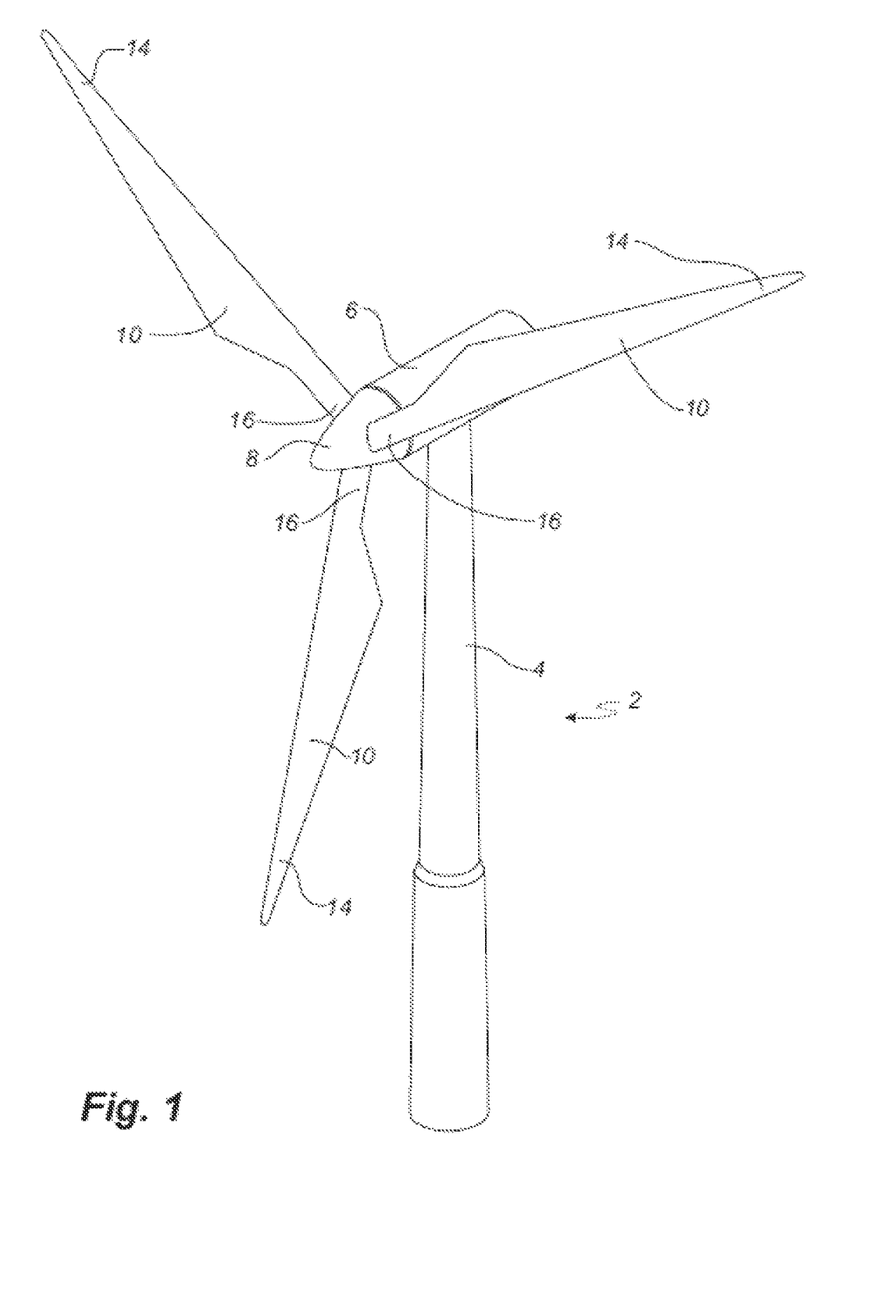
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
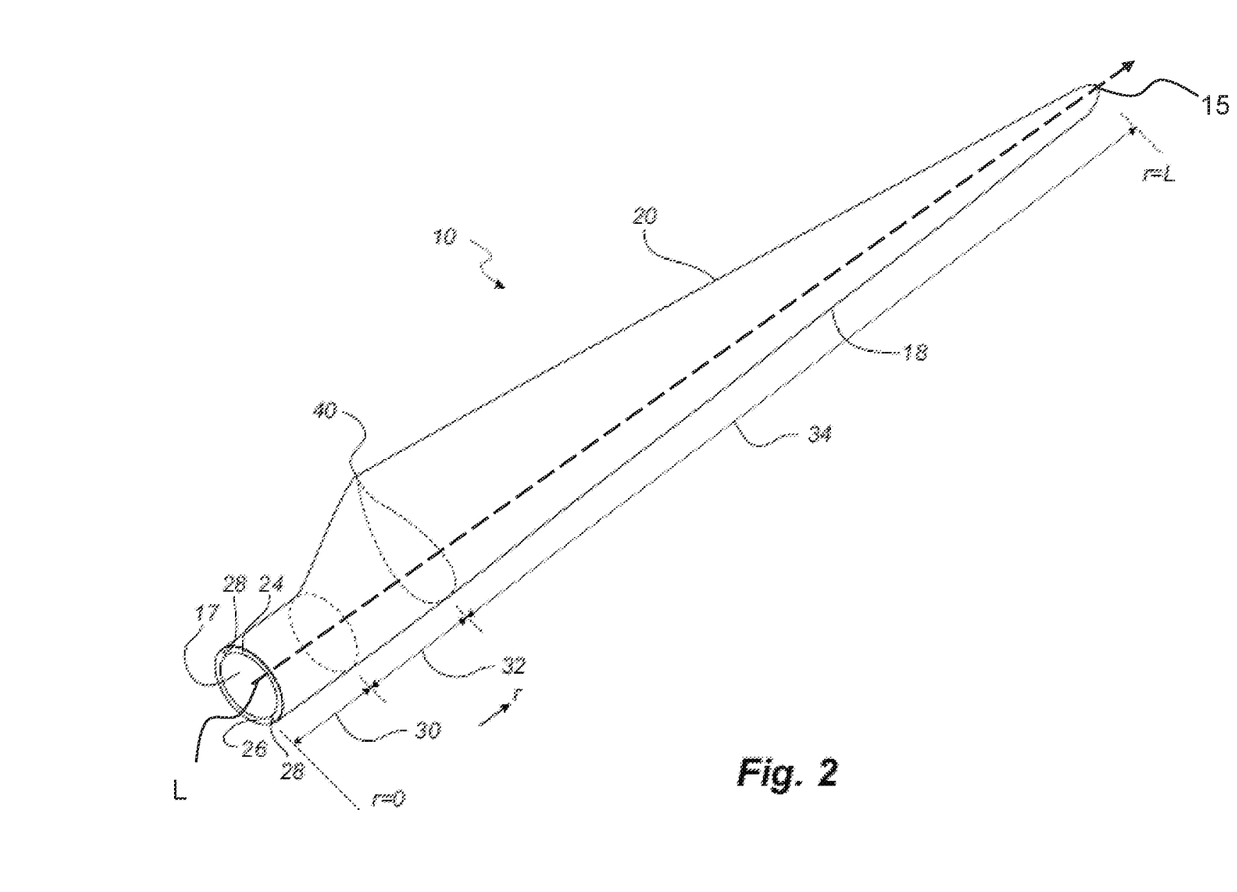
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L.

Figure 3:
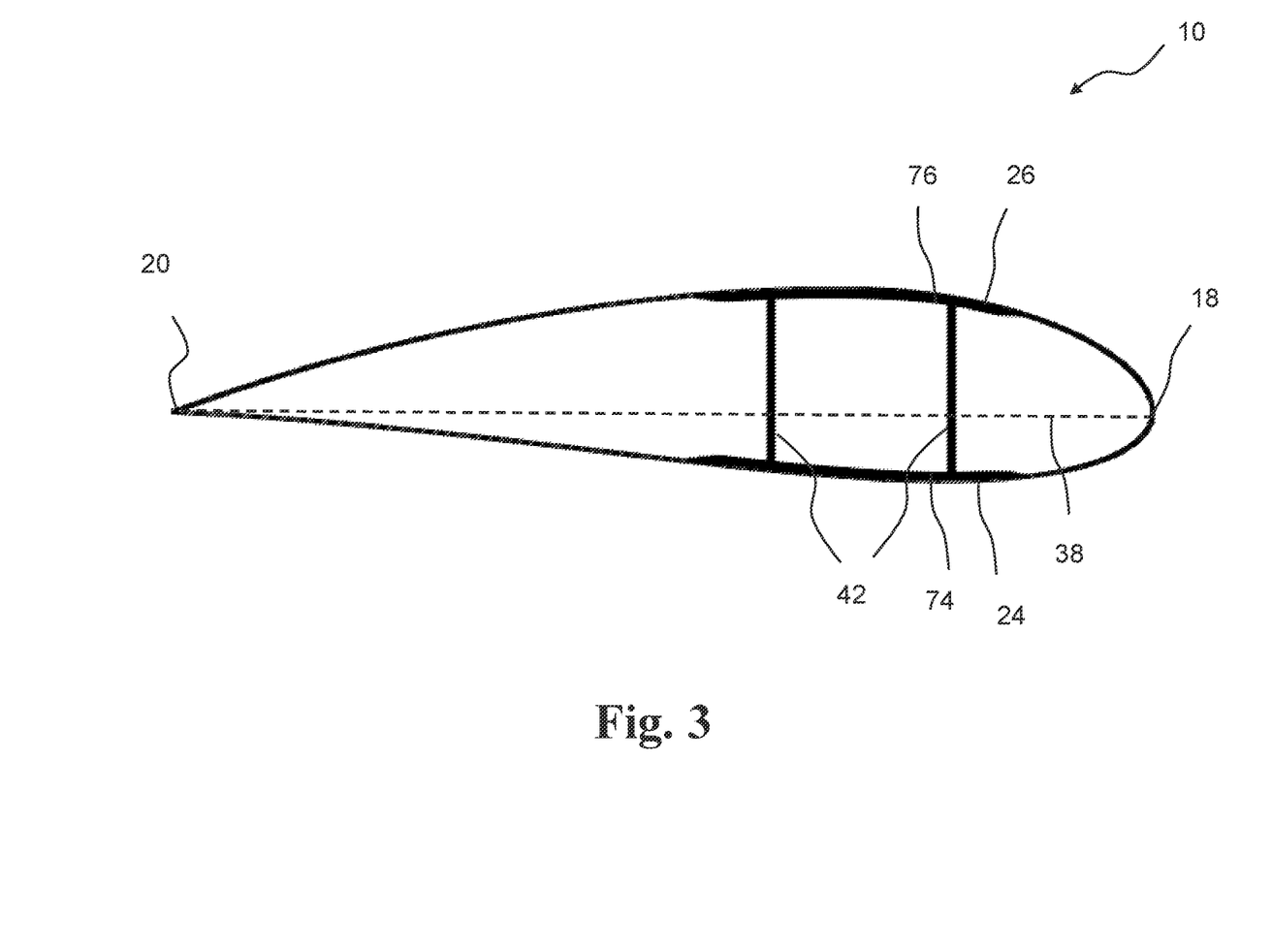
FIG. 3 is a schematic diagram illustrating a cross section of an exemplary wind turbine blade.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, a suction side 26 a first spar cap 74, and a second spar cap 76.

The wind turbine blade 10 comprises a chord line 38 between the leading edge 18 and the trailing edge 20.

The wind turbine blade 10 comprises shear webs 42, such as a leading edge shear web and a trailing edge shear web. The shear webs 42 could alternatively be a spar box with spar sides, such as a trailing edge spar side and a leading edge spar side.

Figure 4:
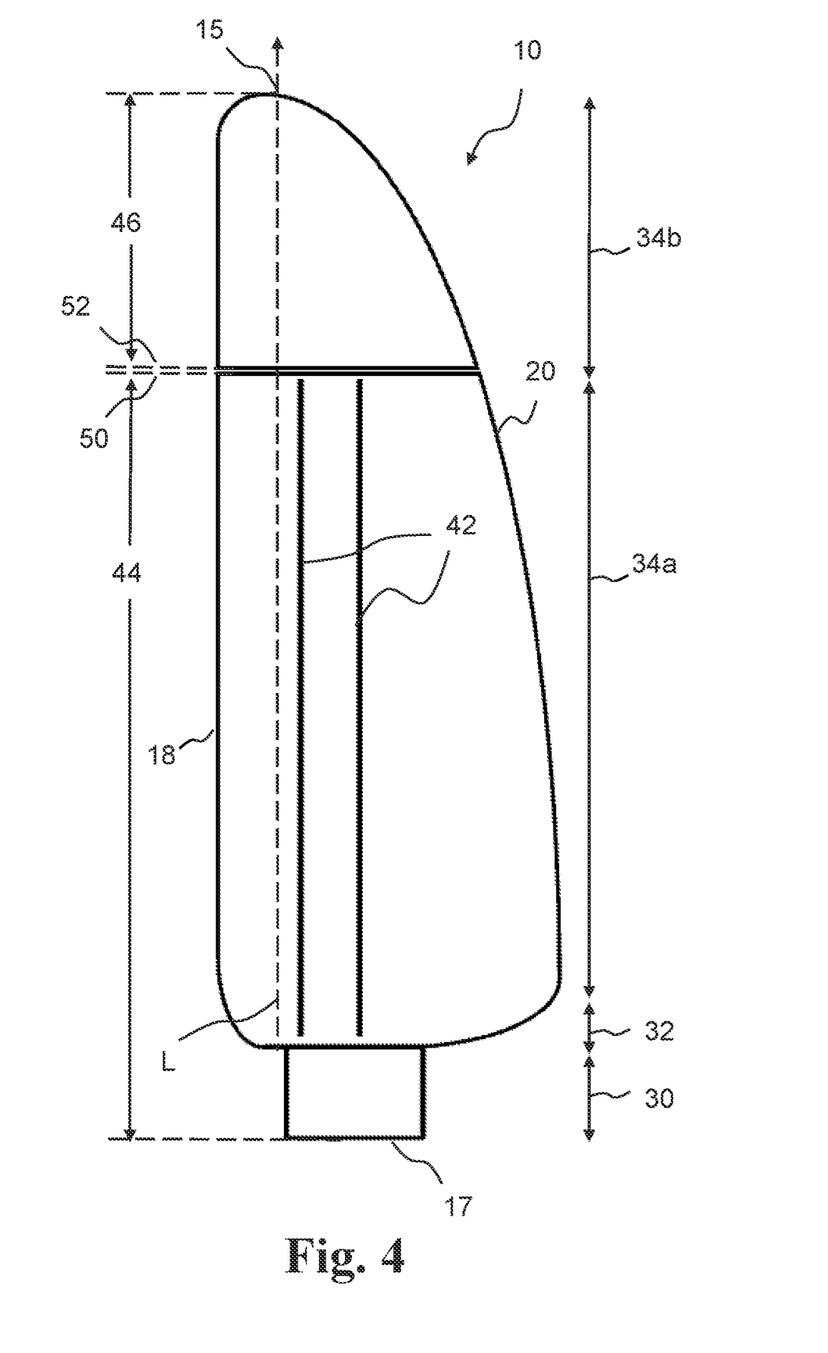
FIG. 4 is a schematic diagram illustrating an exemplary wind turbine blade.

FIG. 4 is a schematic diagram illustrating an exemplary wind turbine blade 10, such as the wind turbine blade 10 of the previous figures. The wind turbine blade 10 comprises a leading edge 18, a trailing edge 20, a tip end 15 and a root end 17. The wind turbine blade 10 comprises shear webs 42, such as a leading edge shear web and a trailing edge shear web.

The wind turbine blade 10 is a so-called split blade, or two-part blade, or segmented blade. The wind turbine blade 10 comprises a first blade section 44 and a second blade section 46. The first blade section 44 extends along the longitudinal axis L from a root, such as the root end 17, to a first end 50. The second blade section 46 extends along the longitudinal axis L from a second end 52 to a tip, such as the tip end 15. The first blade section comprises 44 a root region 30, a first airfoil region 34a and a transition region 32 between the root region 30 and the first airfoil region 34a. The second blade section 46 comprises a second airfoil region 34b with the tip, such as the tip end 15. The first blade section 44 and the second blade section 46 may be connected with a spar beam (see following figures).

Figure 5A:
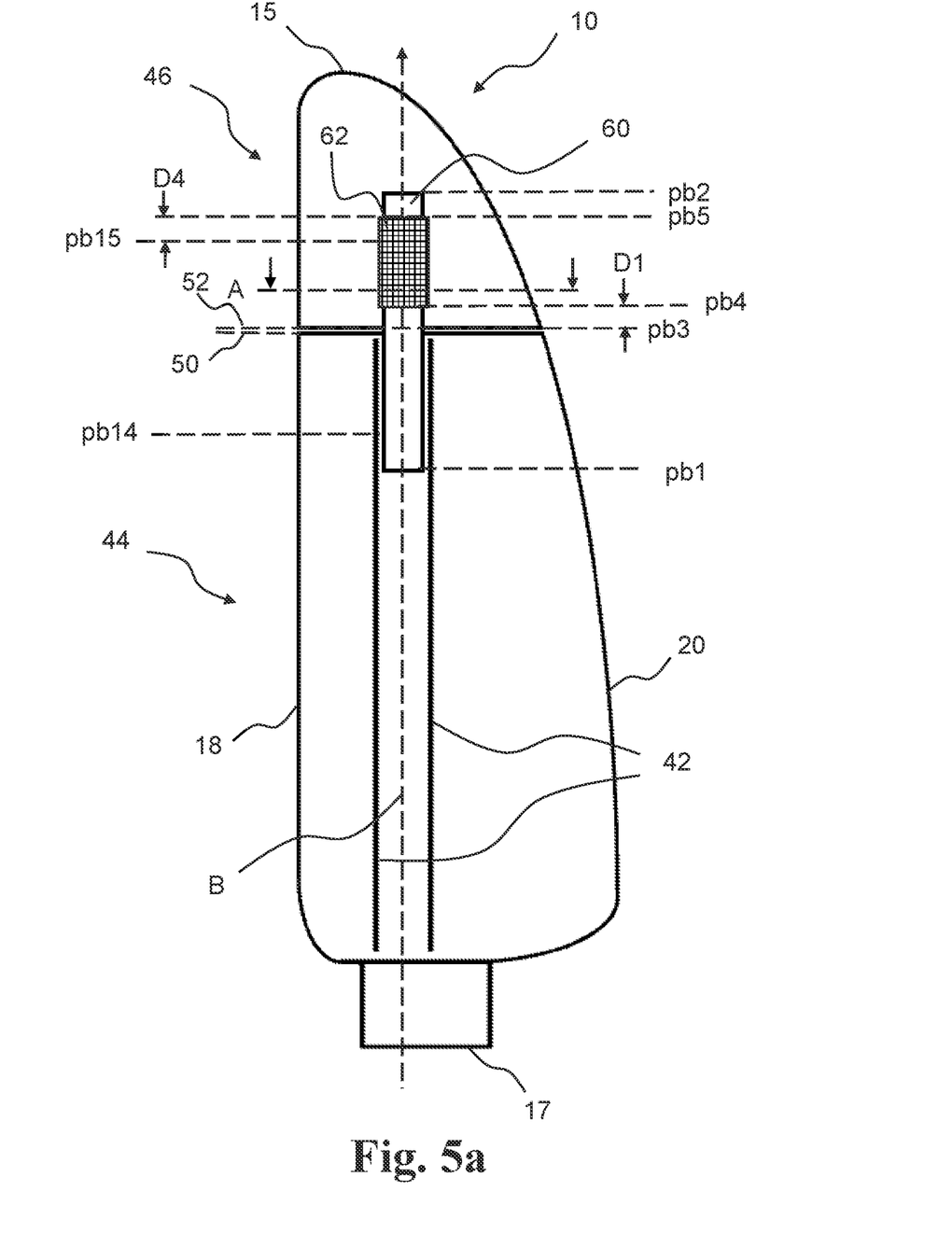
FIG. 5a is a schematic diagram illustrating an exemplary wind turbine blade.

FIG. 5a is a schematic diagram illustrating an exemplary wind turbine blade 10, such as the wind turbine blade 10 of the previous figures. The wind turbine blade 10 comprises first blade section 44, a second blade section 46, and a spar beam 60 for connecting the first blade section 44 and the second blade section 46. The spar beam 60 may comprise carbon fibre, e.g. the spar beam 60 may comprise pultruded carbon fibre reinforced polymer.

The spar beam 60 extends along a spar beam axis B. The spar beam axis B may be coinciding and/or parallel with the longitudinal axis of the wind turbine blade 10. The spar beam 60 extends from a first beam axis position pb1 in the first airfoil region 34a to a second beam axis position pb2 in the second airfoil region 34b.

A third beam axis position pb3 is between the first beam axis position pb1 and second beam axis position pb2. The third beam axis position pb3 is aligned with the second end 52 of the second blade section 46.

The spar beam 60 comprises a conductive beam sheath 62. The conductive beam sheath 62 circumscribes at least a beam sheath angular distance 68 (see, e.g. FIG. 5b) about the spar beam axis B. The conductive beam sheath longitudinally extends from a fourth beam axis position pb4 to a fifth beam axis position pb5. In the illustrated example, the fifth beam axis position pb5 is different from the second beam axis position pb2, e.g. the fifth beam axis position pb5 may be located between the fourth beam axis position pb4 and the second beam axis position pb2. However, alternatively, the fifth beam axis position pb5 may be the second beam axis position pb2. As illustrated, the fourth beam axis position may be between the fifth beam axis position pb5 and the third beam axis position pb3. For example, the fourth beam axis position pb4 and the third beam axis position pb3 may be separated by a first distance D1, e.g. the first distance may be more than 10 mm, such as more than 20 mm, such as 30 mm. Alternatively, the fourth beam axis position pb4 may be located between the third beam axis position pb3 and the first beam axis position pb1. The conductive beam sheath 62 may be a mesh or partly a mesh. The conductive beam sheath 62 may be of an electrically conductive material, such as carbon fiber reinforced polymer or metals, such as copper, or alloy of metals.

Also illustrated are a fourteenth beam axis position pb14 and a fifteenth beam axis position pb15. These positions may denote a part of the spar beam 60 comprising electrically conductive fibres, such as carbon fibres. For example, the spar beam 60 may comprise carbon fibres between the fourteenth beam axis position pb14 and a fifteenth beam axis position pb15. For example, the spar beam may comprise pultruded fibre reinforced elements 110, 112 comprising carbon fibres between the fourteenth beam axis position pb14 and the fifteenth beam axis position pb15. Alternatively or additionally, the pultruded fibre reinforced element 110, 112, e.g. being pultruded carbon fibre reinforced elements may extend between the fourteenth beam axis position pb14 and the fifteenth beam axis position pb15.

The fifteenth beam axis position pb15 is between the fifth beam axis position pb5 and the fourth beam axis position pb4. The fifteenth beam axis position pb15 and the fifth beam axis position pb5 is separated by a fourth distance D4. The fourth distance D4 may be more than 10 mm, such as more than 20 mm, such as more than 30 mm, such as 50 mm. By terminating the content of conductive fibres prior to the end of the conductive beam sheath 62, lightning protection of the spar beam 60 may be enhanced.

Figure 5B:
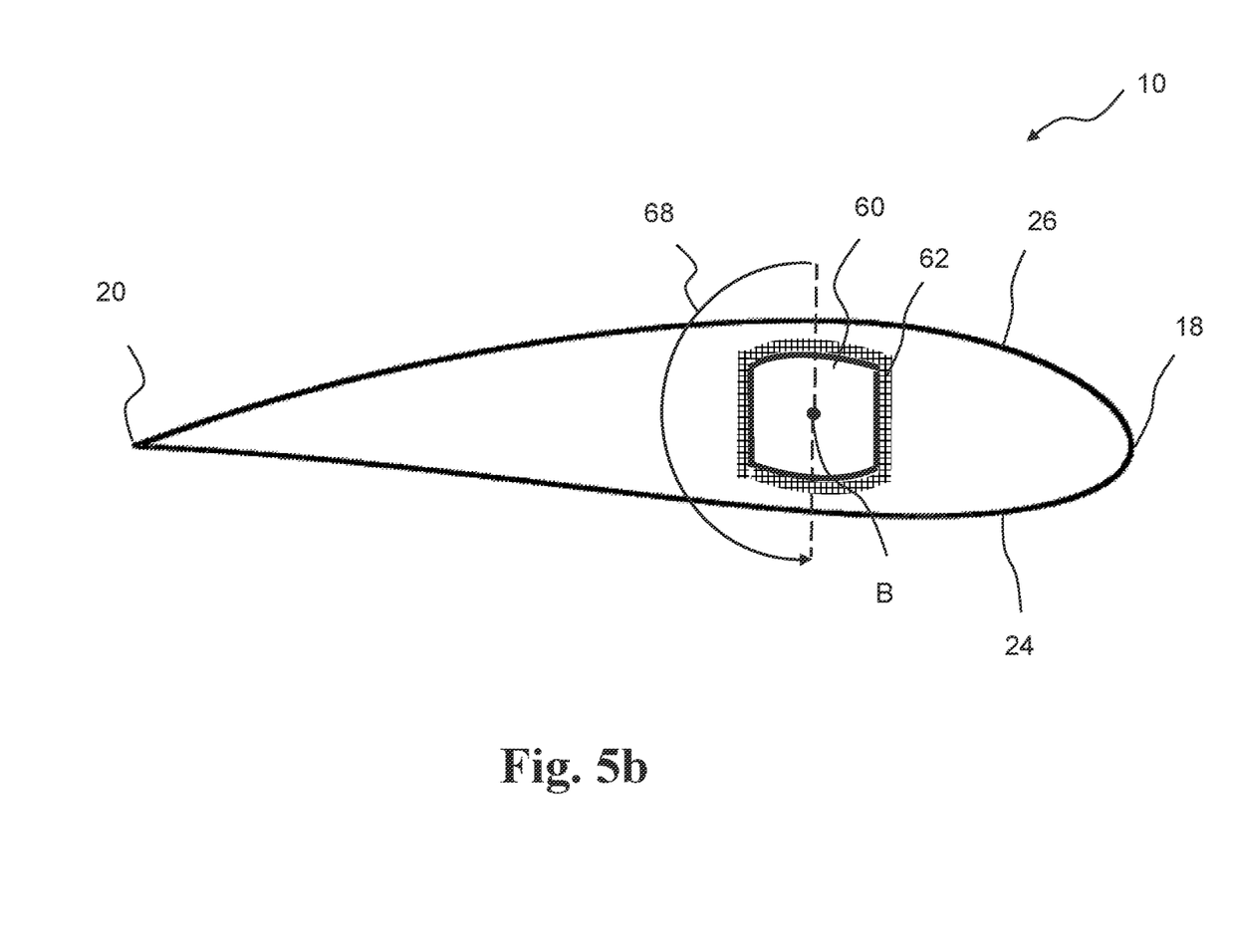
FIG. 5b is a schematic diagram illustrating a cross section of an exemplary wind turbine blade.

FIG. 5b is a schematic diagram illustrating a cross sectional view of an exemplary wind turbine blade 10, e.g. a cross sectional view of the airfoil region, such as the second airfoil region, of the wind turbine blade 10, such as the wind turbine blade 10 of FIG. 5a seen from the line A as indicated in FIG. 5a. Fi. 5c is similar to FIG. 5a, but with the fifth beam axis position pb5 shown as equal to the second beam axis position pb2.

The wind turbine blade 10 comprises a spar beam 60. The spar beam 60 comprises a conductive beam sheath 62 circumscribing at least a beam sheath angular distance 68 about the spar beam axis B. The beam sheath angular distance 68 is more than 90 degrees, such as more than 180 degrees, such as more than 270 degrees, such as 360 degrees. For example, the beam sheath 62 may circumscribe the entire spar beam axis B, e.g. the beam sheath angular distance 68 may be 360 degrees, such as illustrated. The cross section of the spar beam 60 is substantially rectangular. However, alternatively the cross section of the spar beam 60 may be circular or oval.

Figure 6A:
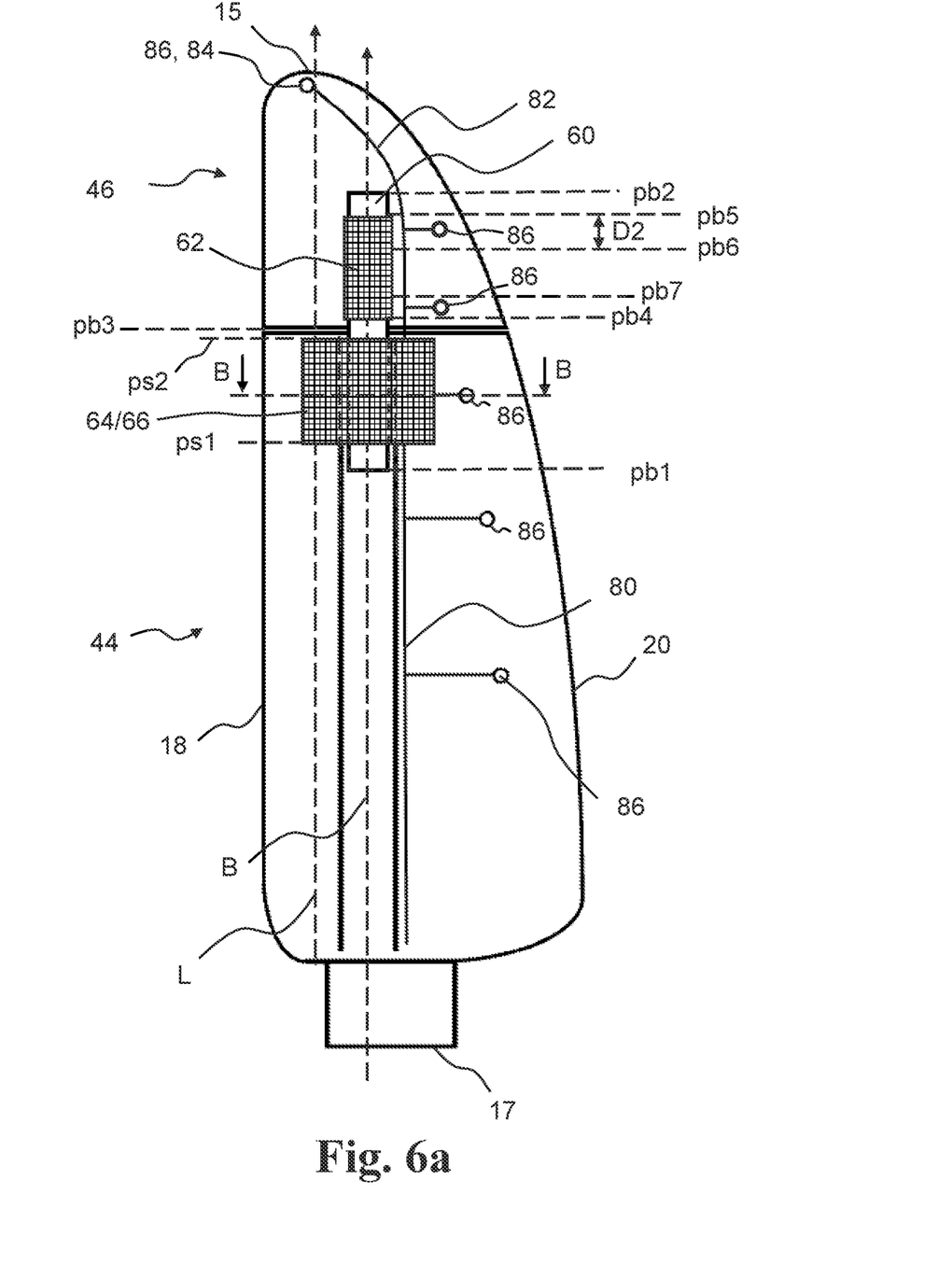

FIG. 6a is a schematic diagram illustrating an exemplary wind turbine blade 10, such as the wind turbine blade 10 of the previous figures. The wind turbine blade 10 comprises a first blade section 44 and a second blade section 46, shear webs 42 and a spar beam 60 with a beam sheath 62. The wind turbine blade comprises a first conductive shell sheath 64 and/or a second conductive shell sheath 66 longitudinally extending from a first sheath position ps1 to a second sheath position ps2. Although not specifically illustrated, the wind turbine blade 10 may comprise a plurality of conductive shell sheaths along the length of the wind turbine blade 10.

The first blade section 44 comprises a first down conductor 80 configured for conducting lightning current to ground. The first down conductor 80 is electrically connected to the first conductive shell sheath 64 and/or the second conductive shell sheath 66. The second blade section 46 comprises a second down conductor 82. The second down conductor 82 is configured for being connected to the first down conductor 80 of the first blade section 44.

The second down conductor 82 is electrically connected to the conductive beam sheath 62 at a sixth beam axis position pb6. The sixth beam axis position pb6 is between the fourth beam axis position pb4 and the fifth beam axis position pb5. The sixth beam axis position pb6 and the fifth beam axis position pb5 is separated by a second distance D2. The second distance D2 may be less than 150 mm, such as less than 100 mm, such as less than 50 mm. In an alternative exemplary wind turbine blade, the sixth beam axis position pb6 may be the fifth beam axis position pb5. For example, the second distance D2 may be 0 mm. The second down conductor 82 may be electrically connected to the conductive beam sheath at a plurality of beam axis positions, e.g. including the sixth beam axis position pb6 and a seventh beam axis position pb7.

The wind turbine blade 10 comprises a plurality of lightning receptors 86 at or in proximity of the external surface of the wind turbine blade 10. The plurality of lightning receptors 86 are electrically connected to the first down conductor 80 and/or the second down conductor 82. The second blade section 46 comprises a first lightning receptor 84. The first lightning receptor 84 is positioned at or in proximity of the tip end 15. The second down conductor 82 is electrically connected to the first lightning receptor 84.

Figure 6B:
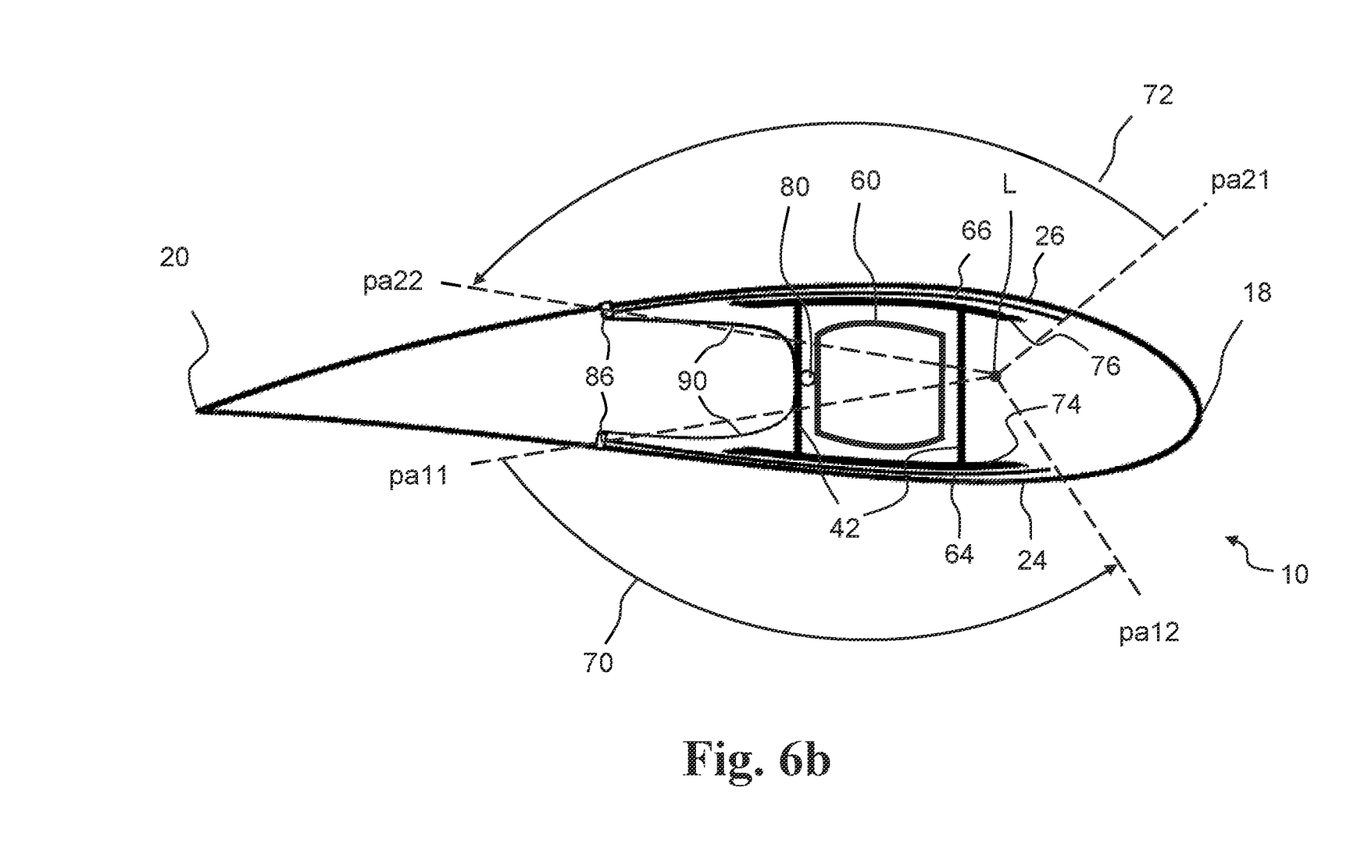
FIG. 6b is a schematic diagram illustrating a cross section of an exemplary wind turbine blade.

FIG. 6b is a schematic diagram illustrating a cross sectional view of an exemplary wind turbine blade 10, such as the wind turbine blade 10 of FIG. 6a seen from the line B indicated in FIG. 6a. The wind turbine blade 10 comprises a leading edge 18, a trailing edge 20, shear webs 42 and a spar beam 60. The wind turbine blade 10 comprises a first shell part, e.g. a pressure side 24 and a second shell part, e.g. the suction side 26.

The first shell part 24 comprises a first conductive shell sheath 64 circumscribing at least a first sheath angular distance 70 about the longitudinal axis L from a first primary sheath angular position pa11 to a first secondary sheath angular position pa12. The first conductive shell sheath 64 may longitudinally extend from a first sheath position ps1. (see FIG. 6a) to a second sheath position ps2 (see FIG. 6a). The first shell part 24 comprises a first spar cap 74. The first conductive shell sheath 64 is positioned such that the first spar cap 74 is located between the first primary sheath angular position pa11 and the first secondary sheath angular position pa12.

The second shell part 26 comprises a second conductive shell sheath 66 circumscribing at least a second sheath angular distance 72 about the longitudinal axis L from a second primary sheath angular position pa21 to a second secondary sheath angular position pa22. The second conductive shell sheath 66 may longitudinally extend from a first sheath position ps1. (see FIG. 6a) to a second sheath position ps2 (see FIG. 6a). The second shell part 26 comprises a second spar cap 76. The second conductive shell sheath 66 is positioned such that the second spar cap is located between the second primary sheath angular position pa21 and the second secondary sheath angular position pa22.

The first conductive shell sheath 64 and/or the second conductive shell sheath 66 may be a mesh or partly a mesh. The first conductive shell sheath 64 and/or the second conductive shell sheath 66 may be of an electrically conductive material, such as carbon fiber reinforced polymer or metals, such as copper, or alloy of metals.

For illustrative purposes, the spar caps 74, 76 and the conductive shell sheaths 64, 66 are shown separately from the shells 24, 26 of the wind turbine blade 10. However, the spar caps 74, 76 and/or the conductive shell sheaths 64, 66 may be integral parts of the shell parts 24, 26.

A first down conductor 80, runs in a longitudinal direction of the blade 10 along the shear web 42, e.g. along the trailing edge shear web. The first down conductor 80 may alternatively run along the leading edge shear web. The first down conductor 80 is electrically connected to a plurality of lightning receptors 86. The lightning receptors 86 may be supported by a receptor bracket 90. The receptor bracket 90 may be of an electrically conductive material, such as a carbon fiber reinforced polymer or metal. Alternatively, the receptor bracket 90 may be of a non-electrically-conductive material, in which case, the receptors 86 may be electrically connected to the first down conductor 80 with cables or other conductive means. The lightning receptors 86 may be located at or in the proximity of the external surface of the wind turbine blade 10.

The term "receptor" is to be understood as an electrically conductive object being configured with a view to capturing and conducting a lightning current.

Throughout the disclosure, the term "conductive", if not specified otherwise, is to be understood as electrically conductive.

Numbered elements are provided purely for naming purposes to allow distinguishing between elements. Hence, numbering does not imply any order of importance, and the presence of a numbered element is not to be construed as implying the presence of any lower numbered elements. For example, a fourth element may be present without a corresponding first, second or third element.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
36 tip region 38 chord line
40 shoulder
42 shear web or spar side
44 first blade section
46 second blade section
50 first end
52 second end
60 spar beam
62 beam sheath
64 first conductive shell sheath
66 second conductive shell sheath
68 beam sheath angular distance
70 first sheath angular distance
72 second sheath angular distance
74 first spar cap
76 second spar cap
80 first down conductor
82 second down conductor
84 first lightning receptor
86 lightning receptor
90 receptor bracket
B spar beam axis
D1 first distance
D2 second distance
D3 third distance
D4 fourth distance
L longitudinal axis
pa11 first primary sheath angular position
pa12 first secondary sheath angular position
pa21 second primary sheath angular position
pa22 second secondary sheath angular position
pb1 first beam axis position
pb2 second beam axis position
pb3 third beam axis position
pb4 fourth beam axis position
pb5 fifth beam axis position
pb6 sixth beam axis position
pb7 seventh beam axis position
pb14 fourteenth beam axis position
pb15 fifteenth beam axis position
ps1 first sheath position
ps2 second sheath position

The invention claimed is:

1. A wind turbine blade extending along a longitudinal axis from a root through a first airfoil region and a second airfoil region to a tip, the wind turbine blade comprising a first blade section extending along the longitudinal axis to a first end and a second blade section extending along the longitudinal axis from a second end towards the tip, the first blade section comprising the first airfoil region, the second blade section comprising the second airfoil region, the wind turbine blade comprising a spar beam structurally connecting the first blade section and the second blade section, the spar beam longitudinally extending along a spar beam axis from a first beam end at a first beam axis position to a second beam end at a second beam axis position and being positioned such that the first beam axis position is located in the first airfoil region and the second beam axis position is located in the second airfoil region and a third beam axis position, between the first beam axis position and the second beam axis position, is aligned with the second end of the second blade section,
wherein the spar beam comprises a conductive beam sheath circumscribing at least a beam sheath angular distance of the spar beam about the spar beam axis and longitudinally extending along the spar beam axis from a fourth beam axis position to a fifth beam axis position,
wherein the fourth beam axis position and the fifth beam axis position are between the first beam axis position and the second beam axis position, and
wherein the fifth beam axis position is between the fourth beam axis position and the second beam axis position.

2. The wind turbine blade according to claim 1, wherein the conductive beam sheath is a mesh of electrically conductive material.

3. The wind turbine blade according to claim 1, wherein the beam sheath angular distance is more than 90 degrees.

4. The wind turbine blade according to claim 3, wherein the beam sheath angular distance is more than 180 degrees.

5. The wind turbine blade according to claim 4, wherein the beam sheath angular distance is more than 270 degrees.

6. The wind turbine blade according to claim 5, wherein the beam sheath angular distance is 360 degrees.

7. The wind turbine blade according to claim 1, wherein the fifth beam axis position is the second beam axis position.

8. The wind turbine blade according to claim 1, wherein the fourth beam axis position is between the third beam axis position and the fifth beam axis position.

9. The wind turbine blade according to claim 1, wherein the fourth beam axis position and the third beam axis position are separated by a first distance, the first distance being more than 10 mm.

10. The wind turbine blade according to claim 1, wherein the spar beam comprises carbon fibre with a fibre volume ratio of more than 40%.

11. The wind turbine blade according to claim 10, wherein the fibre volume ratio is more than 50%.

12. The wind turbine blade according to claim 11, wherein the fibre volume ratio is more than 60%.

13. The wind turbine blade according to claim 1, wherein a first shell part of the first blade section comprises a first conductive shell sheath circumscribing at least a first sheath angular distance about the longitudinal axis from a first primary sheath angular position to a first secondary sheath angular position and longitudinally extending from a first sheath position to a second sheath position.

14. The wind turbine blade according to claim 13, wherein the first shell part comprises a first spar cap, and wherein the first conductive shell sheath is positioned such that the first spar cap is located between the first primary sheath angular position and the first secondary sheath angular position, and/or
wherein a second shell part of the first blade section comprises a second conductive shell sheath circumscribing at least a second sheath angular distance about the longitudinal axis from a second primary sheath angular position to a second secondary sheath angular position and longitudinally extending from the first sheath position to the second sheath position, optionally wherein the second shell part comprises a second spar cap, and wherein the second conductive shell sheath is positioned such that the second spar cap is located between the second primary sheath angular position and the second secondary sheath angular position, and/or
wherein the first conductive shell sheath and/or the second conductive shell sheath is a mesh of electrically conductive material.

15. The wind turbine blade according to claim 1, wherein the first blade section comprises a first down conductor configured for conducting lightning current to ground.

16. The wind turbine blade according to claim 15, wherein the first down conductor is electrically connected to the first conductive beam sheath and/or the second conductive beam sheath.

17. The wind turbine blade according to claim 16, wherein the second blade section comprises a second down conductor being connected to the first down conductor of the first blade section.

18. The wind turbine blade according to claim 17, Wherein the second down conductor is electrically connected to the conductive beam sheath at a sixth beam axis position, wherein the sixth beam axis position is between the fourth beam axis position and the fifth beam axis position, and wherein the sixth beam axis position and the fifth beam axis position is separated by a second distance, the second distance being less than 100 mm.

19. The wind turbine blade according to claim 18, wherein the second distance is less than 50 mm.

20. The wind turbine blade according to claim 19, wherein the sixth beam axis position is equal to the fifth beam axis position.

21. The wind turbine blade according to claim 1, Wherein the second blade section comprises a first lightning receptor at or in proximity of the external surface of the blade, wherein the first lightning receptor is positioned at or in proximity of the tip.

22. The wind turbine blade according to claim 21, wherein the second down conductor is electrically connected to the first lightning receptor.

23. A wind turbine blade extending along a longitudinal axis from a root through a first airfoil region and a second airfoil region to a tip, the wind turbine blade comprising a first blade section extending along the longitudinal axis to a first end and a second blade section extending along the longitudinal axis from a second end towards the tip, the first blade section comprising the first airfoil region, the second blade section comprising the second airfoil region, the wind turbine blade comprising a spar beam structurally connecting the first blade section and the second blade section, the spar beam longitudinally extending along a spar beam axis from a first beam end at a first beam axis position to a second beam end at a second beam axis position and being positioned such that the first beam axis position is located in the first airfoil region and the second beam axis position is located in the second airfoil region and a third beam axis position, between the first beam axis position and the second beam axis position, is aligned with the second end of the second blade section, wherein the spar beam comprises a conductive beam sheath circumscribing at least a beam sheath angular distance of the spar beam about the spar beam axis and longitudinally extending along the spar beam axis from a fourth beam axis position to a fifth beam axis position, and wherein the fourth beam axis position and the third beam axis position are separated by a first distance, the first distance being more than 10 mm.

24. A wind turbine blade extending along a longitudinal axis from a root through a first airfoil region and a second airfoil region to a tip, the wind turbine blade comprising a first blade section extending along the longitudinal axis to a first end and a second blade section extending along the longitudinal axis from a second end towards the tip, the first blade section comprising the first airfoil region, the second blade section comprising the second airfoil region, the wind turbine blade comprising a spar beam structurally connecting the first blade section and the second blade section, the spar beam longitudinally extending along a spar beam axis from a first beam end at a first beam axis position to a second beam end at a second beam axis position and being positioned such that the first beam axis position is located in the first airfoil region and the second beam axis position is located in the second airfoil region and a third beam axis position, between the first beam axis position and the second beam axis position, is aligned with the second end of the second blade section, wherein the spar beam comprises a conductive beam sheath circumscribing at least a beam sheath angular distance of the spar beam about the spar beam axis and longitudinally extending along the spar beam axis from a fourth beam axis position to a fifth beam axis position, wherein the first blade section comprises a first down conductor configured for conducting lightning current to ground, wherein the first down conductor is electrically connected to the first conductive shell sheath and/or the second conductive shell sheath, wherein the second blade section comprises a second down conductor being connected to the first down conductor of the first blade section, and wherein the second down conductor is electrically connected to the conductive beam sheath at a sixth beam axis position, wherein the sixth beam axis position is between the fourth beam axis position and the fifth beam axis position, and wherein the sixth beam axis position and the fifth beam axis position is separated by a second distance, the second distance being less than 100 nm.

* * * * *